United States Patent
Torre Sarmiento

(10) Patent No.: US 10,198,917 B2
(45) Date of Patent: Feb. 5, 2019

(54) MOBILE EMERGENCY LIGHT DEVICE

(71) Applicant: Netun Solutions, S.L., Vigo (ES)

(72) Inventor: Jorge Torre Sarmiento, Vigo (ES)

(73) Assignee: Netun Solutions, S.L., Vigo (ES)

( * ) Notice: Subject to any disclaimer, the term of this patent is extended or adjusted under 35 U.S.C. 154(b) by 19 days.

(21) Appl. No.: 15/493,848

(22) Filed: Apr. 21, 2017

(65) Prior Publication Data

US 2017/0365136 A1 Dec. 21, 2017

(30) Foreign Application Priority Data

Jun. 16, 2016 (ES) .............................. 201630780 U

(51) Int. Cl.
| | |
|---|---|
| *F21V 11/00* | (2015.01) |
| *G08B 5/00* | (2006.01) |
| *F21K 9/68* | (2016.01) |
| *F21K 9/69* | (2016.01) |
| *F21V 5/04* | (2006.01) |
| *F21V 7/04* | (2006.01) |
| *F21V 13/04* | (2006.01) |
| *F21V 23/00* | (2015.01) |
| *F21V 23/04* | (2006.01) |
| *F21V 31/00* | (2006.01) |
| *B60Q 1/26* | (2006.01) |

(Continued)

(52) U.S. Cl.
CPC ............ *G08B 5/002* (2013.01); *B60Q 1/2611* (2013.01); *B60Q 1/2615* (2013.01); *B60Q 1/52* (2013.01); *F21K 9/68* (2016.08); *F21K 9/69* (2016.08); *F21S 9/022* (2013.01); *F21V 5/04* (2013.01); *F21V 7/0016* (2013.01); *F21V 7/04* (2013.01); *F21V 13/04* (2013.01); *F21V 21/096* (2013.01); *F21V 23/003* (2013.01); *F21V 23/04* (2013.01); *F21V 23/0407* (2013.01); *F21V 31/005* (2013.01); *F21W 2111/00* (2013.01); *F21Y 2115/10* (2016.08)

(58) Field of Classification Search
CPC ............... H01H 36/00; H01H 36/0006; H01H 36/0013; H01H 36/002; H01H 36/0026; H01H 36/0073; H01H 36/0093; H01H 36/02; F21V 7/0075; F21V 7/043; F21V 7/046; F21V 7/07; F21W 2111/10; G08B 5/002; F21K 9/68; F21K 9/69
USPC ......................................................... 362/235
See application file for complete search history.

(56) References Cited

U.S. PATENT DOCUMENTS

| | | | | |
|---|---|---|---|---|
| 3,305,805 A | * | 2/1967 | Tann ........................ | G01V 3/08 324/228 |
| 5,309,337 A | * | 5/1994 | Groben ................... | F21L 15/02 362/188 |

(Continued)

*Primary Examiner* — Anh T Mai
*Assistant Examiner* — Matthew J. Peerce
(74) *Attorney, Agent, or Firm* — Richard M. Goldberg

(57) ABSTRACT

A mobile emergency light device includes a casing (1), a moving closure cover (2), a translucent lens (3), an electronic circuit board (5) for control, and a combined reflector (4), in which the combined reflector (4) has an inverted bell shape and is open at both ends, in which the electronic circuit board is securely connected to the combined reflector (4), and provided with a plurality of light-emitting diodes (LED), suitably angled towards the combined reflector (4), and in which the casing (1) forms inside this a cylindrical cavity (13), whose interior houses an automatic switch, driven by the base of the casing approaching a ferromagnetic material.

11 Claims, 2 Drawing Sheets

(51) Int. Cl.
*B60Q 1/52* (2006.01)
*F21S 9/02* (2006.01)
*F21V 7/00* (2006.01)
*F21V 21/096* (2006.01)
*F21Y 115/10* (2016.01)
*F21W 111/00* (2006.01)

(56) References Cited

U.S. PATENT DOCUMENTS

| | | | | |
|---|---|---|---|---|
| 2006/0176702 | A1* | 8/2006 | Shen | B60Q 1/2611 362/295 |
| 2008/0266035 | A1* | 10/2008 | Rohrig | H01H 36/002 335/205 |
| 2014/0152454 | A1* | 6/2014 | Rabin | G08B 5/002 340/815.45 |
| 2015/0274231 | A1* | 10/2015 | White | B62J 6/02 362/475 |
| 2016/0040841 | A1* | 2/2016 | Martzall | F21V 23/04 362/183 |
| 2016/0053966 | A1* | 2/2016 | Dassanayake | F21V 7/0016 362/296.06 |

* cited by examiner

MOBILE EMERGENCY LIGHT DEVICE

This invention consists of a light device mainly intended for visual warning and identification of a danger situation or of any immobile element, for example a vehicle, or as a means of emergency localisation, or for indicating exits or points of encounter in critical conditions. The device according to the invention preferably works automatically, by magnetic inductive means, without requiring any external manual operating switch. Neither is it necessary to use a cable for plugging it into any external power source, since preferably an electrical battery, either rechargeable or not, is used. This also involves the novelty of its size, which is miniature, and a triple flash emergency light emission sequence, which can easily be identified by anyone, anywhere in the world; it also involves the option of changing the flashing mode to a steady light mode at will, meaning that this is therefore useful as both an emergency flashing light and as a steady omnidirectional light. It lastly has a communication system, working for example by means of radio frequency, to a remote unit; the remote unit can be a mobile terminal, a fixed computer or in the cloud, so that the device according to the invention can be governed by means of a fixed terminal or mobile terminal, for example a Smartphone, a tablet or similar. Both the remote unit and the governing terminal are provided with the relevant software.

The governing terminal thus enables sending the information required for controlling the invention device, either directly or through an operations centre, previously installed in a conventional mobile terminal, in order to communicate certain data or values for use in emergencies and predetermined automatic instructions from any mobile terminal, through a repeater, to a remote database, or to any official or private telephone emergency management centre, all by means of an additional communication board; at the same time, the remote software, pre-installed in the associated mobile terminal, will enable the user to view predetermined instructions, or to directly get in touch with the emergency systems, with an assistance insurance firm or even with the police, etc., as well as showing the exact position in which this person is located. All of this is achieved with a miniature-sized device, able to be carried in a jacket pocket, or in the glove compartment with the papers of a conventional car or of a motor cycle.

The device is mainly conceived as a first emergency, or early emergency light, not depending on any external power supply, for all social uses in which a signal clearly identifying danger is required, and for cases of necessity in remote places, although this is preferably intended for the private automobile sector, and very particularly for users with mobility problems, to be able to identify their location with no need to get out of the vehicle, as a replacement or complement for the advance warning triangle, through being much safer and visually effective than this, above all at night-time, when there is a greater risk of being run over, as shown by the official figures associated with this kind of situations; but it can also be used as an auxiliary light like a torch and with hands free, covering 180 degrees around its axis, as a support in any possible situations of need, such as breakdowns, accidents and any other situations which require using a fixed emergency light device, without the disadvantages proper to this type of device, normally torches with directional point light, which also require hands in order to be held and turned.

The functions of the device covered by this invention are similarly applicable to the mobile emergency light devices connected with professional uses, such as those of the police or transport services in general, since apart from the technical qualities associated with telecommunication of the basic functions of the device, enabling the user to have absolute control over proper operation of the emergency light device, this device provides the user with a steady emergency auxiliary light source like a torch, which turns the signalling device into a very effective lighting tool, by offering functions beyond the actual emergency warning, in the same device, and can be used for multiple purposes in critical scenarios, such as traffic accidents, caring for the injured, identification checks, etc.

BACKGROUND OF THE INVENTION AND STATE OF THE ART

The use of mobile emergency light devices is widely known in the state of the art, although all of these are intended for professional use, either by different police forces and public services in general, or by the professional transport world or slow industrial vehicles, even for signposting works services in public thoroughfares. All of these have several aspects in common: they are all devices intended for professional uses, all of them have a single monochromatic light source, all of them work with a predetermined sequential signal and all of them are powered from an external source by means of a cable. Some of them have a steady light source, to which a rotating reflecting screen is added to provide the flashing effect, and others work with sequences of flashes caused by the activity of a stroboscopic lamp, and others emit in predefined pulsations, such as those of the present LED devices, which redirect their beam of light through a collimating source, or by means of a fixed bell-shaped reflector medium. Although there is a present a mobile device which enables using a rechargeable battery, this is intended exclusively for professional use, but keeping the same criterion of a single flashing or intermittent monochromatic light source, as well as its auxiliary dependence on a cable; a manual switch is required for its operation in almost all cases or it is the connection plug itself which acts as a switch, although there are now devices which incorporate an automatic internal magnetic switch of the mechanical type, meaning that the movement of a cylinder activating a pushbutton or similar is required. These devices are activated by physically resting on an inductive source, such a ferrous material of a certain density, at which time the interior magnet, which remains at rest, lifted by an elastic element, overcomes the force of said spring, and presses one of any commercial switches, normally of the lever type, activating the charge. These devices nevertheless always require a high-density inductive surface slightly adapted for its professional use, meaning that a very fine sheet of steel is unable to cause the movement of the switch.

Mobile emergency devices are furthermore conceived to provide an unmarked police vehicle with a vital element to reveal its presence and have this seen by other drivers, in order to make way between them, thanks to its identification colour. Likewise, certain machines, cranes or industrial vehicles use this type of device in special circumstances, normally to alert users to the presence of items or obstacles on the road performing technical tasks, extremely slow traffic, or as a safety complement for the operators themselves. In short, this equipment is intended exclusively for professional uses and is not conceived or designed to warn of a specific danger situation.

Due to the high rate of accidents caused by stopping through breakdowns, some legislations in the European setting are tending towards permissiveness as regards the use of these professional warning systems by private users, in the amber colour mode, for signalling a vehicle as an obstacle on the road, as is the case of Spain, for example. These warning devices, whose own technical, construction and flashing frequency characteristics provide no distinction between the different conditions of use, nevertheless cause serious confusion to drivers, who are not able to distinguish industrial signposting of road works or services from a danger situation. For this reason any drivers that see these do not take special precautions when they are noticed, unless the signal is of another colour, such as blue, in which case they clearly identify a police emergency vehicle and thus take safety measures. Apart from this the dependence on a power cable means that in most cases these warning devices are completely useless due to the emergency or accident situation itself. This situation is mainly due to the non-existence of a specific signal associated with the emergency situation associated with these cases until this date. The only sign known hitherto is the prior emergency warning triangle, whose use nevertheless involves a clear risk of being knocked down, as shown by the high accident rates, even greater because of the present characteristics of roads, which are much faster that these used to be, and which mean that this sign not only fails to be efficient, but exponentially increases the risk of being run over above all in conditions with poor light, where the reaction time also increases substantially for obvious reasons.

Another of the disadvantages of today's devices is, for example, the space that these take up in a vehicle, incompatible with their portability in the interior, as these are very bulky and heavy items that were never conceived for use as private or personal emergency equipment. Their size also makes it impossible to hold or handle these with just one hand and their connection by means of a cable—as well as entailing risk when connected, since simply plugging them in can lead to a dangerous situation in atmospheres with inflammable gases in the cases of accidents—does not allow these to be easily transported, stored and used either; their dependence on the cable is incompatible with an electrical breakdown, the most common cause of stopping on the road at the present time, or with the circumstances of natural stress associated with an emergency stop caused by an accident. The mobile equipment with batteries on the market today is designed for continuous professional use, and its technical maintenance features and size are thus incompatible with occasional use, the essential characteristic defining a personal emergency situation; its high manufacturing cost also prevents easy access of users to this type of equipment, and far less so on a widespread basis.

Lastly, there are different lights of all kinds on the market combining an intermittent, directional element with a white light source, torch, etc., all fitted with several types of reflectors, one or more switches, independent, and working with commercially available batteries or cables. This sort of equipment is incompatible with emergency warning due to its volume, weight and to its own large-sized construction structure, not proving convenient or fast to handle. The lamps emitting intermittent light do so in a specific direction and in an on-and-off sequence that is not distinctive and fails to identify the situation, which means the user has to adopt measures involving knowledge of the device and the setting, such as seeking the position towards which this has to point and an appropriate place; their size means that these are carried in the boot. Their emission power is not conceived to be visible beyond a few meters either.

The devices which have reflectors on them have bell-shaped designs, in a single piece or several aligned around an axis, but none of these offers the possibility of using both sides as combined reflector units, or has considered this until now.

Furthermore, none of the devices currently found on the market enables remote software of any kind to be automatically activated.

Mobile flashing emergency devices for private automobiles which are autonomous, small in size, which have more than a single monochromatic light source, which provide a signal clearly identifying a hazard, or which include a steady light torch, which also have very sensitive mechanical or inductive activation, the possibility of automatic and manual activation with no need for an external switch, and which also allow the possibility of triggering automatic remote activation of emergency software in a mobile terminal, such as a mobile telephone or a tablet, and which use a bell-shaped reflector with dual, external and internal, reflector face as light-emitting source, depending on the lighting needs, either directional or omnidirectional, are therefore not known of.

SUMMARY OF THE INVENTION

There are some important new aspects in the device covered by this invention in respect of the devices currently being used, since this is a signalling item which fulfils a specific function of warning of danger by emitting a specific identifiable light signal, with absolutely intuitive usage conditions, provided with different innovative elements determining its small size, its intuitive and safe handling, and its capacity for emitting and concentrating or deconcentrating the light beam, as well as its capability for wireless communication by means of a radiofrequency emission unit, in correspondence with a receiving element previously installed in a mobile terminal and using a specific telecommunications software.

The device of the invention is made up of:
a body or casing in a preferably cylindrical shape,
one or more magnets in this body or casing, with a predetermined polar orientation; these magnets act as both an element for securing the device to a metal base and as an element for activating a corresponding electrical circuit which turns this device on.
An electronic circuit board which in turn comprises:
A set of light-emitting diodes (LED);
A circuit for activating the device: this activation works by means of distortion or induction by a magnetic field in the electronic circuit board.
A circuit for generating the light-emitting source;
A circuit for regulating the signal and flashing frequency;
A circuit for wireless communications; and
One or more switches for inductive activation or deactivation of the switch or reed switch type or of the mechanical type, which can be combined should this be convenient, depending on the final application of the device.
a cavity which acts as the housing for an electrical battery, said electrical battery being connected to the electronic circuit board by means of a connecting cable or by means of terminals
and a moving cover, preferably of the bayonet coupling type, able to rotate on itself; this cover is provided with:
an extra-fine disk or sheet of ferrous material
a waterproofing seal a reflector in the form of an inverted paraboloid reflecting on both sides and a translucent lens with appropriate guides for spreading a light beam evenly.

The electronic circuit board is securely joined to the reflector.

The size of the device is preferably such that its base fits in the palm of the hand, and can be grasped by a single hand (roughly 8 to 12 cm in diameter, without implying any limitation); the central section of the lens forms a rounded arch and its height is from one to two times the diameter of the casing, the device not having any sharp edges.

BRIEF DESCRIPTION OF THE DRAWINGS

In order to illustrate the following explanation, two sheets of drawings are enclosed with this descriptive report, in which three figures represent the essence of this invention for illustrative purposes, without constituting any limitation, and in which.

Figure 1:
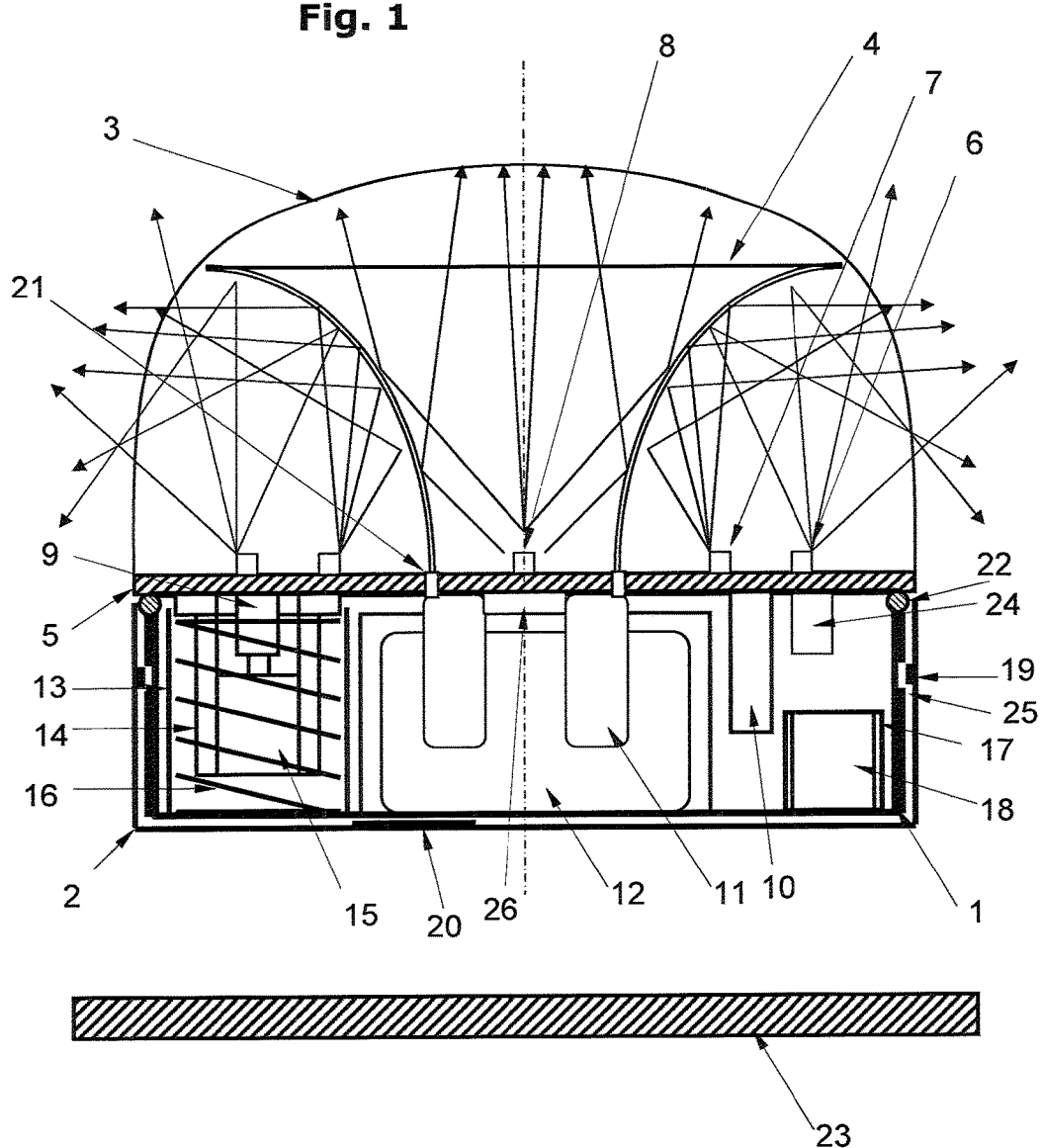
FIG. 1 Shows a schematic cross-section view of the device, where all the elements forming this can be appreciated.
Figure 2:
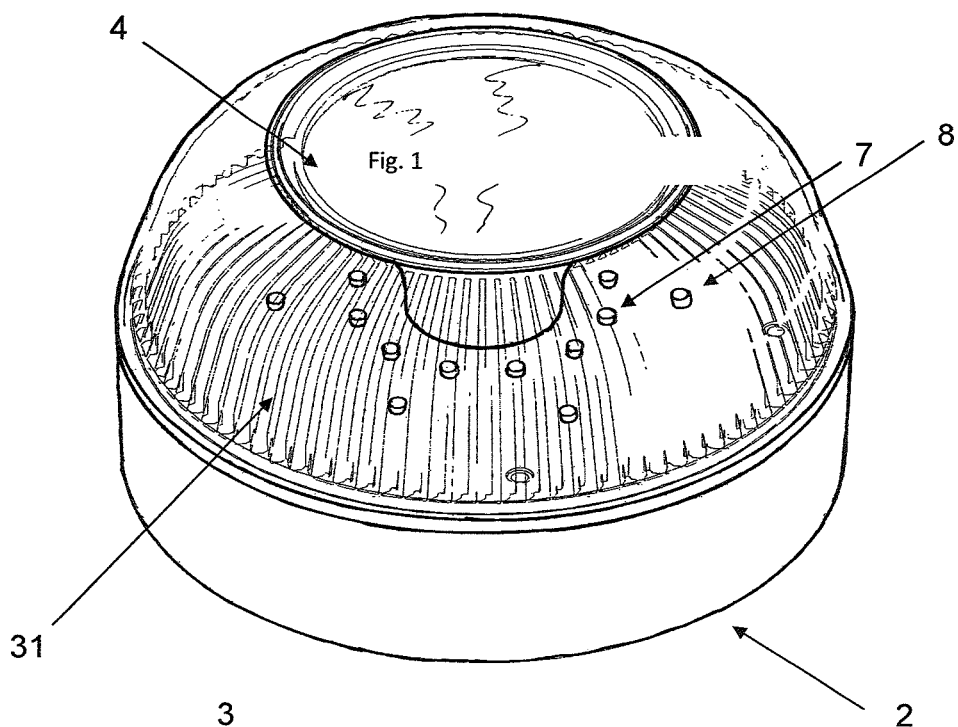
FIG. 2 Shows an external view in perspective of the device seen in FIG. 1.
Figure 3:
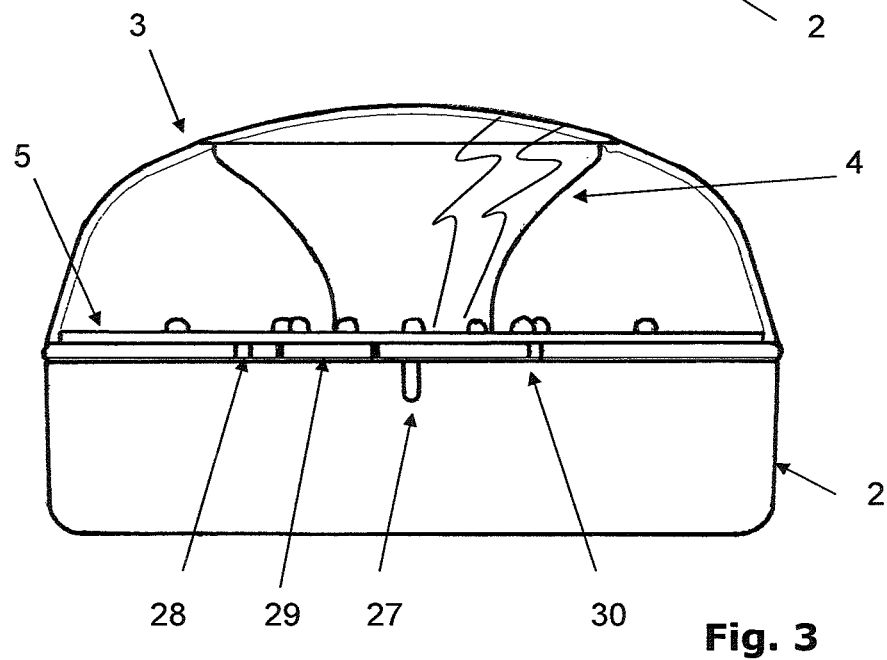
FIG. 3 Shows a side view in which the different operating positions can be seen.

The following reference numbers are used in said figures:
1 Casing
2 Moving closure cover
3 Translucent lens
4 Combined reflector (on the interior and exterior sides)
5 Electronic control circuit board
6 First set of LEDs placed around the reflector
7 Second set of LEDs aligned under the reflector
8 Third set of LEDs inside the bell shape
9 Pushbutton
10 Telecommunications module
11 Connection terminals
12 Electrical accumulator (battery)
13 Cylindrical cavity
14 Plunger
15 First permanent magnet
16 Spiral spring
17 Second cavity
18 Second permanent magnet
19 Bosses
20 Plate made of ferromagnetic material
21 Adjusting bosses
22 Seal
23 Outer ferromagnetic surface
24 Electrolytic capacitors
25 Guides
26 Reed switch
27 Protuberance
28 Mark to show the position for removing the cover
29 Mark to show the manual ON position
30 Mark to show the manual OFF position
31 Radial ribs

DESCRIPTION OF THE PREFERENTIAL FORMS OF EMBODIMENT OF THE INVENTION

In view of these figures, the mobile emergency light device covered by this invention can be seen to be made up of a set of items including a casing 1, on which a moving closure cover 2 and a translucent lens 3 are fitted; the casing houses the following items in its interior:

a combined reflector element 4;

an electronic circuit board 5, normally securely joined to the combined reflector 4;

a set of electroluminescent photodiodes or LEDs 6, 7 and 8 placed circumferentially on the plate around its axis; the LEDs are placed in predetermined positions and angled towards specific points of the combined reflector element 4, in order to refract the beams of light of the LEDs in specific directions, depending on the form of operation of the device, these LED assemblies being:

a first set of LEDs 6, aligned around the combined reflector 4 at its outermost perimeter in such a way that the resulting light beams are dissipated in all directions, limited by the position of the casing 1;

a second set of LEDs 7, aligned under the combined reflector (4) in a predetermined position in order to reflect the resulting beams of light horizontally to the axis of symmetry of the device according to a predefined calculation of the paraboloid of the combined reflector 4;

and a third set of LEDs 8, placed inside the bell shape of the combined reflector 4 so that the resulting beams of light point towards the uppermost area of the device;

a switch device 9 placed in the electronic circuit board 5, which can be activated mechanically or by means of the effect of a magnetic field;

a telecommunications module 10;

electrical connection terminals 11 appropriate for an electrical battery 12, which is housed inside the casing 1, this battery being able to be rechargeable or disposable (for example one, or a set of, commercially available batteries);

one or more electrolytic capacitors 24.

The casing 1 forms in its interior a normally cylindrical cavity 13 housing inside this a plunger 14 fitted with a first permanent magnet 15 which is acted on by a spiral spring 16, which pushes and keeps the plunger 14 in a "raised" rest position, that is, separated from the support base, by pressing a pushbutton 9. In one position, normally symmetrical with the cylindrical cavity 13 in respect of the axis of the device, there is a second cavity 17 containing a second permanent magnet 18, so that said permanent magnet adopts a fixed position, normally resting on the bottom of the casing 1. Permanent magnets one 15 and two 18 can both be placed in a position of polar parallelism or not, depending on the operating requirements of the device. The deformation of the magnetic field produced by drawing the base of the casing 1 up to, or resting this on, a surface made of a ferromagnetic material 23 determines the attraction of the first permanent magnet 15 to said base, overcoming the resistance of the spiral spring 16 and activating the operation of the device; the pushbutton 9 is permanently connected to the electronic circuit board 5, and to the electrical battery 12 which is housed inside the casing 1, and accessible by taking off the cover of the moving closure cover 2, which is removable.

There is a bayonet-type coupling between the casing 1 and the moving closure cover 2. This cover is provided with a plurality of bosses 19 associated with different guides 25 made in the walls of the casing 1, by means of which the position of the moving closure cover 2 over the casing 1 is fixed, and which allows a rotation movement limited by the end-of-stroke stop of the guides 25, which means different positions can be adopted:

a fixed and inactive closure position, an activation position in which the ferromagnetic material plate 20 is located under the plunger 14 and aligned with this, and which determines the attraction of the first permanent magnet 15, in polar alignment with the second permanent magnet 18, towards said plate 20, which means the pressure of the spiral spring 16 on the pushbutton 9 is released, activating operation, and a position for removing the cover The moving closure cover 2 has a protuberance 27 on the outside as a visual and tactile guide, acting in agreement with respective alignment marks 28, 29 and 30, which emerge from the visible ring of the casing 1, 28 being a mark for removing the cover, 29 a mark which indicates the manual ON position and 30 a mark indicating the manual OFF position.

The combined reflector element 4 consists of an inverted bell-shaped element open at both ends, where its two exposed sides, external and internal, have an appropriate reflector substrate for reflecting the light hitting this in a predetermined direction given by the prior calculation of the paraboloid of both internal and external sides. This item is permanently and securely fixed to the plate 5 with two or more adjustment bosses 21. On receiving the light beams coming from the LED 8, the internal face determines the directionality of the light towards the uppermost part of the device, and the external side determines the directionality of the light emitted by LEDs 6 and 7 in the pre-calculated directions, so that the combined reflector 4 can determine between at least two and three formats for dispersion or concentration of the incident light, with no need to resort to any further moving items.

A seal 22 has been designed between the casing 1 and the moving closure cover 2 in order to ensure that the interior of the device is sealed against any external agents such as water, gases, humidity or dust.

The lens 3 is grooved on the inside by means of radial ribs 31 which facilitate the dispersion of the light beams stemming from the source of light and the combined reflector 4.

This device works as follows: when the device 1 is manually coupled to a ferromagnetic surface 23 by means of its casing, the first permanent magnet 15, attracted by the ferromagnetic mass, will cause the compression of the spiral spring 16 and the movement of the plunger 14 through the cylindrical cavity 13, releasing the pressure on the pushbutton 9, which will close the circuit, thus powering the electronic circuit board 5 through the current supplied by the electrical battery 12, which will trigger off the line of LED 7. This LED will emit predefined flashes of light against a predetermined arch of the paraboloid on the outside face of the combined reflector 4, concentrating the light on a disk of light three hundred and sixty degrees around the axis of symmetry of the device. At the same time the telecommunications module 10 is activated, allowing its connection to a mobile terminal previously associated by means of a specific software, and transmission of the pre-recorded orders or factors. Likewise, the energy released by the electrical battery 12 will supply a series of electrolytic capacitors 24 located under the electronic circuit board 5, in order to determine the change of lighting status of the device. If the device is lifted and again rested on the ferromagnetic surface 23 in a short interval of time, this will automatically switch off LED 7 and the telecommunications module 10, and switch on the series of LEDs 6 and 8, or only one or the other, with the device going into steady light mode, in white for example, and whose light beams, hitting the outer and inner faces of the combined reflector 4, will determine a uniform light source around the whole device and in all possible directions, only limited in the arch by the position of the casing 1.

In view of the possible lack of a ferromagnetic surface 23, and as a manual form of activation, it has been designed for the moving closure cover 2 to be able to rotate a certain angle determined by the end-of-stroke stop of the guides 25 in agreement with the bosses 19, in such a way that the plate made of ferromagnetic material 20 set in its interior can be located, at the wish of the device's users, under the position occupied by the plunger 14, and thus make the device operate in the same way as if it were over any ferromagnetic surface 23, without any such surface being necessary. Hence, a rotating movement of the moving closure cover 2 in respect of the casing 1 in more than one cycle is able to make the same changes as the ones mentioned in the previously indicated function, the device in short being able to work both ways, with no need for an external pushbutton device. Operating in this manual mode will be determined by the parallel polar position of permanent magnets one 15 and two 18.

In another form of embodiment, the device is not fitted with the pushbutton 9, and the plunger 14 and the spiral spring 16 are replaced by a reed switch 26 element placed on the surface of the electronic circuit board 5 and symmetrically angled between permanent magnets one 15 and two 18, whose position is fixed in respect of the casing 1. The mutual polar orientation of said permanent magnets in this embodiment is similarly in parallel, so that a stable single-pole magnetic field is generated around the reed switch 26, which keeps this in the open position. When any ferromagnetic surface 23 comes close to this, said reed switch 26 closes due to the polar reorientation of the magnets in respect of the ferromagnetic surface 23, leading to powering the side of the device, which will act in the same way as described above.

The device thus has two different light functions, depending on the way this is activated, either directional flashing, or a steady omnidirectional light, determined by the action of the inductive activation device.

It has finally been designed for the activation of LEDs 7 placed around the combined reflector 4 which emit their beam three hundred and sixty degrees around the axis of symmetry to be done in cycles with a sequences of 0.050+ 0.300+0.050+0.300+0.050+1.200, (time in seconds) where 0.050 is an active "on" state and the rest inactive "off". This light emission will preferably be in amber colour.

What is claimed is:

1. A mobile emergency light device, comprising:
    a casing;
    a closure cover connected with the casing and rotatably movable with respect to said casing;
    a translucent lens connected with the casing;
    an electronic circuit board in the casing for control of lighting by the mobile emergency light device; and
    a combined reflector;
    wherein the combined reflector has an inverted bell shape and is open at both ends;
    wherein the electronic circuit board is securely connected to the combined reflector, and is provided with a plurality of light-emitting diodes (LED), angled towards said combined reflector; and
    wherein the casing forms at an inside thereof a cylindrical cavity which houses an automatic switch, driven by a base of the casing approaching a ferromagnetic material;

wherein the automatic switch includes a plunger which incorporates a first permanent magnet, with a spiral spring which in a natural position presses the plunger against a pushbutton;

further comprising a second permanent magnet in a position normally diametrically opposite to the first permanent magnet, and with a same polar orientation, which generates a stable and balanced magnetic field between the first permanent magnet and the second permanent magnet so that deformation of a magnetic field arising by the base of the casing approaching or resting on a surface made of a ferromagnetic material determines attraction of the first permanent magnet to said base, overcoming a resistance of the spiral spring and activating operation of the device;

wherein the pushbutton is permanently connected to the electronic circuit board, and to a power source determined by an electrical battery housed inside the casing, said electrical power source being accessible from the moving closure cover;

wherein the movable closure cover is removable, enabling access to an inside of the casing in which the electrical battery is located;

wherein an inner side of the cover is provided with a plate made of a ferromagnetic material, placed in accordance with the position of the plunger;

wherein said cover is provided with a plurality of bosses associated with different guides made in walls of the casing, by which a position of the moving closure cover is fixed over the casing, and enables a rotation movement limited by an end-of-stroke stop of the guides, so that different positions can be adopted as follows:
a fixed and inactive closed position,
an activation position in which the plate made of ferromagnetic material is located under the plunger and which determines the attraction of the first permanent magnet, in polar alignment with the second permanent magnet, towards said plate, which thus releases pressure of the spiral spring over the pushbutton activating operation, and
a position for removing the cover; and wherein a waterproofing seal is fitted between the casing and the movable closure cover.

2. A mobile emergency light device, according to claim 1, wherein the electronic circuit board is provided with a telecommunications module, for connection to an external device.

3. A mobile emergency light device, according to claim 2, wherein the external device is a mobile terminal provided with software for communicating with the telecommunications module.

4. A mobile emergency light device, according to claim 1, wherein the plurality of light-emitting diodes (LED) of the electronic circuit board includes:
a first set of LEDs aligned around the combined reflector at an outermost perimeter thereof, so that resulting beams of light are dissipated in all directions, limited by the position of the casing;
a second set of LEDs aligned under the combined reflector in a predetermined position in order to reflect the resulting beams of light horizontally to an axis of symmetry of the device according to a predefined calculation of a paraboloid of the combined reflector; and
a third set of LEDs, placed inside the bell-shaped combined reflector so that the resulting beams of light are angled towards an uppermost zone of the device.

5. A mobile emergency light device, according to claim 4, further comprising at least one electrolytic capacitor connected with the battery for supplying current to the first, second and third sets of LEDS, and wherein the electronic circuit board respectively connects the first, second and third sets of LEDs with the electrical battery, whereby when the device is drawn up several times over a ferromagnetic surface and the battery is disconnected with the LEDS, the at least one electrolytic capacitor is connected with the LEDS so that a time threshold predefined by a capacity of said electrolytic capacitors is exceeded, the device returns to an original state of rest.

6. A mobile emergency light device, according to claim 4, wherein the second set of LEDs arranged around the combined reflector, emit around three hundred and sixty degrees in a horizontal direction in respect of an axis of symmetry of the device, in an amber colour, and with a triple flash sequence preferably predefined by the following sequence in seconds: 0.050+0.300+0.050+0.300+0.050+1.200, where 0.050 is an active state "on", and the rest are inactive "off".

7. A mobile emergency light device, according to claim 1, wherein the lens is grooved on an inside thereof by radial ribs which facilitate the dispersion of light beams coming from the light-emitting diodes (LED) and from the combined reflector.

8. A mobile emergency light device, according to claim 1, wherein when the moving closure cover is fitted on the casing, this casing leaves an annular zone visible and wherein the moving closure cover has a protuberance on an outside thereof as a visual and tactile guide, which acts in agreement with alignment marks which emerge from a visible ring of the casing, said alignment marks being:
a mark indicating a position for removing the cover;
a mark indicating a position for manual activation; and
a mark indicating a position for manual deactivation.

9. A mobile emergency light device, according to claim 1, wherein the device has two light functions, depending on the form of activation as one of:
a directional flashing mode, and
an omnidirectional steady light.

10. A mobile emergency light device, according to claim 1, wherein the plate made of a ferromagnetic material is disk-shaped.

11. A mobile emergency light device, comprising:
a casing;
a closure cover connected with the casing and rotatably movable with respect to said casing;
a translucent lens connected with the casing;
an electronic circuit board in the casing for control of lighting by the mobile emergency light device; and
a combined reflector;
wherein the combined reflector has an inverted bell shape and is open at both ends;
wherein the electronic circuit board is securely connected to the combined reflector, and is provided with a plurality of light-emitting diodes (LED), angled towards said combined reflector; and
wherein the casing forms at an inside thereof a cylindrical cavity which houses an automatic switch, driven by a base of the casing approaching a ferromagnetic material;
further comprising first and second permanent magnets in a position normally diametrically opposite to each other, and with a same polar orientation, which generates a stable and balanced magnetic field between the first permanent magnet and the second permanent magnet;

wherein the automatic switch is of a reed switch type, securely joined to the electronic circuit board, and located symmetrically between the first and second permanent magnets, permanently fixed in turn to a surface of the casing and arranged in parallel polarity, in which operation is activated by drawing either of the permanent magnets up to a ferromagnetic body;

wherein deformation of a magnetic field arising by the base of the casing approaching or resting on a surface made of a ferromagnetic material results in closing of the reed switch;

wherein the movable closure cover is removable, enabling access to an inside of the casing in which the electrical battery is located;

wherein an inner side of the cover is provided with a plate made of a ferromagnetic material;

wherein said cover is provided with a plurality of bosses associated with different guides made in walls of the casing, by which a position of the moving closure cover is fixed over the casing, and enables a rotation movement limited by an end-of-stroke stop of the guides, so that different positions can be adopted as follows:
 a fixed and inactive closed position,
 an activation position in which the plate made of ferromagnetic material determines closing of the reed switch,
 a position for removing the cover; and wherein a waterproofing seal is fitted between the casing and the movable closure cover.

* * * * *